United States Patent
Cook

[11] Patent Number: 6,035,512
[45] Date of Patent: Mar. 14, 2000

[54] MACHINE TOOL EXTENSION AND METHOD OF FORMING THE SAME

[76] Inventor: Harold D. Cook, 33642 Via Martos, Dana Point, Calif. 92629

[21] Appl. No.: 09/277,273

[22] Filed: Mar. 26, 1999

[51] Int. Cl.[7] ............................. B23P 11/62; B23B 31/10; B23C 9/00

[52] U.S. Cl. ................................ 29/447; 29/508; 29/517; 279/103; 279/145; 408/199; 408/239 A; 409/234

[58] Field of Search ..................................... 409/232, 231, 409/233, 234; 29/447, 446, 525; 403/273, 372, 369; 272/102, 103, 158; 408/144, 199, 226, 231, 238, 239 R, 239 A, 1 R; 76/119, 108.1, 108.6

[56] References Cited

U.S. PATENT DOCUMENTS

| | | |
|---|---|---|
| 845,717 | 2/1907 | Miller ........................................ 403/370 |
| 1,285,589 | 11/1918 | Barnes . |
| 1,404,016 | 1/1922 | Engelbrekt . |
| 1,409,753 | 3/1922 | Moore . |
| 1,539,413 | 5/1925 | Fish . |
| 1,658,504 | 2/1928 | Weiss . |
| 1,936,498 | 11/1933 | Corbett ...................................... 76/108 |
| 1,994,792 | 3/1935 | Sanderson ................................. 255/63 |
| 2,058,618 | 10/1936 | Patzig ....................................... 403/273 |
| 2,125,005 | 7/1938 | Jearum ....................................... 29/96 |
| 2,161,062 | 6/1939 | Killgore .................................... 262/33 |
| 2,374,919 | 5/1945 | Bruseth ....................................... 90/11 |
| 2,729,458 | 1/1956 | Sacrey ....................................... 279/41 |
| 2,860,547 | 11/1958 | Stephan ....................................... 90/11 |
| 2,893,291 | 7/1959 | Hollis ......................................... 90/11 |
| 2,913,935 | 11/1959 | Flannerty et al. .......................... 77/58 |
| 2,918,290 | 12/1959 | Werstein .................................... 279/19 |
| 2,920,913 | 1/1960 | Antila ....................................... 287/119 |
| 2,942,891 | 6/1960 | Zale ............................................ 279/1 |
| 3,053,118 | 9/1962 | Lavallee . |
| 3,221,404 | 12/1965 | Averill et al. ............................. 29/568 |
| 3,307,243 | 3/1967 | Andreasson ............................... 29/106 |
| 3,372,951 | 3/1968 | McCash ..................................... 287/91 |
| 3,397,615 | 8/1968 | Meinke ....................................... 90/11 |
| 3,424,055 | 1/1969 | Rollat .......................................... 90/11 |

(List continued on next page.)

FOREIGN PATENT DOCUMENTS

| | | |
|---|---|---|
| 0026751 | 11/1981 | European Pat. Off. .............. 279/11 S |
| 382079B1 | 8/1993 | European Pat. Off. . |
| 575009 | 4/1933 | Germany . |
| 662704 | 6/1938 | Germany . |
| 1008546 | 5/1957 | Germany . |
| 1008085 | 10/1957 | Germany . |
| 1238311 | 4/1967 | Germany . |
| 2229374 | 1/1974 | Germany ............................... 279/1 A |
| 2759007 | 8/1978 | Germany ........................... 408/239 A |
| 2811977 | 9/1979 | Germany . |

(List continued on next page.)

OTHER PUBLICATIONS

MI–Tech Metals, Inc., "High Density Tungsten Based Metals" 4 pages.

Primary Examiner—William Briggs
Attorney, Agent, or Firm—Stetina Brunda Garred & Brucker

[57] ABSTRACT

A machine tool extension for interfacing a cutting tool having a generally cylindrical shank portion to a tool holder having a central opening. The extension comprises an elongate, generally cylindrical shank member having first end and a reduced diameter second end. The first end of the shank member is insertable into and securable within the central opening of the tool holder. The extension further comprises a bushing member having an aperture extending longitudinally therethrough. The second end of the shank member is insertable and securable within one end of the aperture, with the shank portion of the cutting tool being at least partially insertable into and securable within the other end of the aperture. The shank member is formed to have an outer diameter which slightly exceeds the diameter of the central opening of the tool holder. Additionally, the aperture is formed to have a diameter which is slightly less than the diameters of the second end of the shank member and the shank portion of the cutting tool.

11 Claims, 1 Drawing Sheet

U.S. PATENT DOCUMENTS

| | | | |
|---|---|---|---|
| 3,463,048 | 8/1969 | Owsen | 90/11 |
| 3,557,419 | 1/1971 | Flannery | 29/105 |
| 3,643,546 | 2/1972 | Richter et al. | 90/11 A |
| 3,678,632 | 7/1972 | Eversole et al. | 408/144 |
| 3,725,994 | 4/1973 | Wechsler | 29/447 |
| 3,734,515 | 5/1973 | Dudek | 279/1 A |
| 3,807,804 | 4/1974 | Kniff | 299/91 |
| 3,876,320 | 4/1975 | Phillipson | 403/370 |
| 3,937,587 | 2/1976 | Linden et al. | 408/181 |
| 3,945,752 | 3/1976 | Bennet | 408/146 |
| 3,989,260 | 11/1976 | Zonkov et al. | 279/4 |
| 3,994,615 | 11/1976 | Narang | 408/226 |
| 4,021,051 | 5/1977 | Toyomoto et al. | 279/1 N |
| 4,099,889 | 7/1978 | Vig | 408/239 R |
| 4,133,545 | 1/1979 | Komori | 279/83 |
| 4,226,562 | 10/1980 | Schmid et al. | 409/233 |
| 4,251,113 | 2/1981 | Mitin et al. | 299/69 |
| 4,274,774 | 6/1981 | Haga et al. | 409/232 |
| 4,298,208 | 11/1981 | Benjamin et al. | 279/91 |
| 4,305,203 | 12/1981 | Bock et al. | 29/800 |
| 4,377,292 | 3/1983 | Staron | 279/46 R |
| 4,436,463 | 3/1984 | Rea | 409/232 |
| 4,453,775 | 6/1984 | Clemmow | 299/81 |
| 4,560,289 | 12/1985 | Wood, III | 384/99 |
| 4,619,564 | 10/1986 | Jacobson | 408/146 |
| 4,642,005 | 2/1987 | Kondo et al. | 409/232 |
| 4,668,138 | 5/1987 | Carter | 409/234 |
| 4,795,292 | 1/1989 | Dye | 409/136 |
| 4,808,049 | 2/1989 | Cook | 409/234 |
| 4,811,632 | 3/1989 | Salyer | 76/24 R |
| 4,818,161 | 4/1989 | Cook | 409/233 |
| 4,843,108 | 6/1989 | Howard | 408/499 |
| 4,934,743 | 6/1990 | Kapgan et al. | 285/23 |
| 4,971,491 | 11/1990 | Cook | 409/131 |
| 4,991,991 | 2/1991 | Ito et al. | 403/30 |
| 4,993,894 | 2/1991 | Fischer et al. | 408/14 |
| 5,018,915 | 5/1991 | Inokomsihl et al. | 409/238 X |
| 5,024,563 | 6/1991 | Randall | 408/144 |
| 5,048,375 | 9/1991 | Kobayashi | 76/108 |
| 5,052,610 | 10/1991 | Guerra et al. | 403/273 |
| 5,098,234 | 3/1992 | Judkins et al. | 408/204 |
| 5,140,739 | 8/1992 | Yamaguchi et al. | 279/158 X |
| 5,150,636 | 9/1992 | Hill | 76/108.2 |
| 5,277,435 | 1/1994 | Kramer et al. | 2779/9.1 |
| 5,278,354 | 1/1994 | Lhomme | 174/84 R |
| 5,280,671 | 1/1994 | Marquart | |
| 5,311,654 | 5/1994 | Cook | 29/447 |
| 5,352,074 | 10/1994 | Ishikawa | 409/232 |
| 5,582,494 | 12/1996 | Cook | 409/234 |
| 5,593,258 | 1/1997 | Matsumoto et al. | 409/234 |
| 5,775,857 | 7/1998 | Johne | 409/234 |
| 5,797,605 | 8/1998 | Gross et al. | 279/4.05 |

FOREIGN PATENT DOCUMENTS

| | | | |
|---|---|---|---|
| 3701602 | 8/1988 | Germany | |
| 3925641C2 | 9/1992 | Germany | |
| 5316976 | 2/1978 | Japan | 279/1 A |
| 57107710 | 5/1982 | Japan | 279/9.1 |
| 376182 | 5/1979 | U.S.S.R. | |
| 1493389 | 7/1989 | U.S.S.R. | |
| 425539 | 4/1935 | United Kingdom | |
| 551065 | 2/1942 | United Kingdom | |
| 729295 | 5/1955 | United Kingdom | 279/8 |
| 921522 | 3/1963 | United Kingdom | 340/279 |
| 1319200 | 6/1973 | United Kingdom | |
| 319200 | 6/1973 | United Kingdom | |
| 2137124A | 10/1984 | United Kingdom | 279/7 |

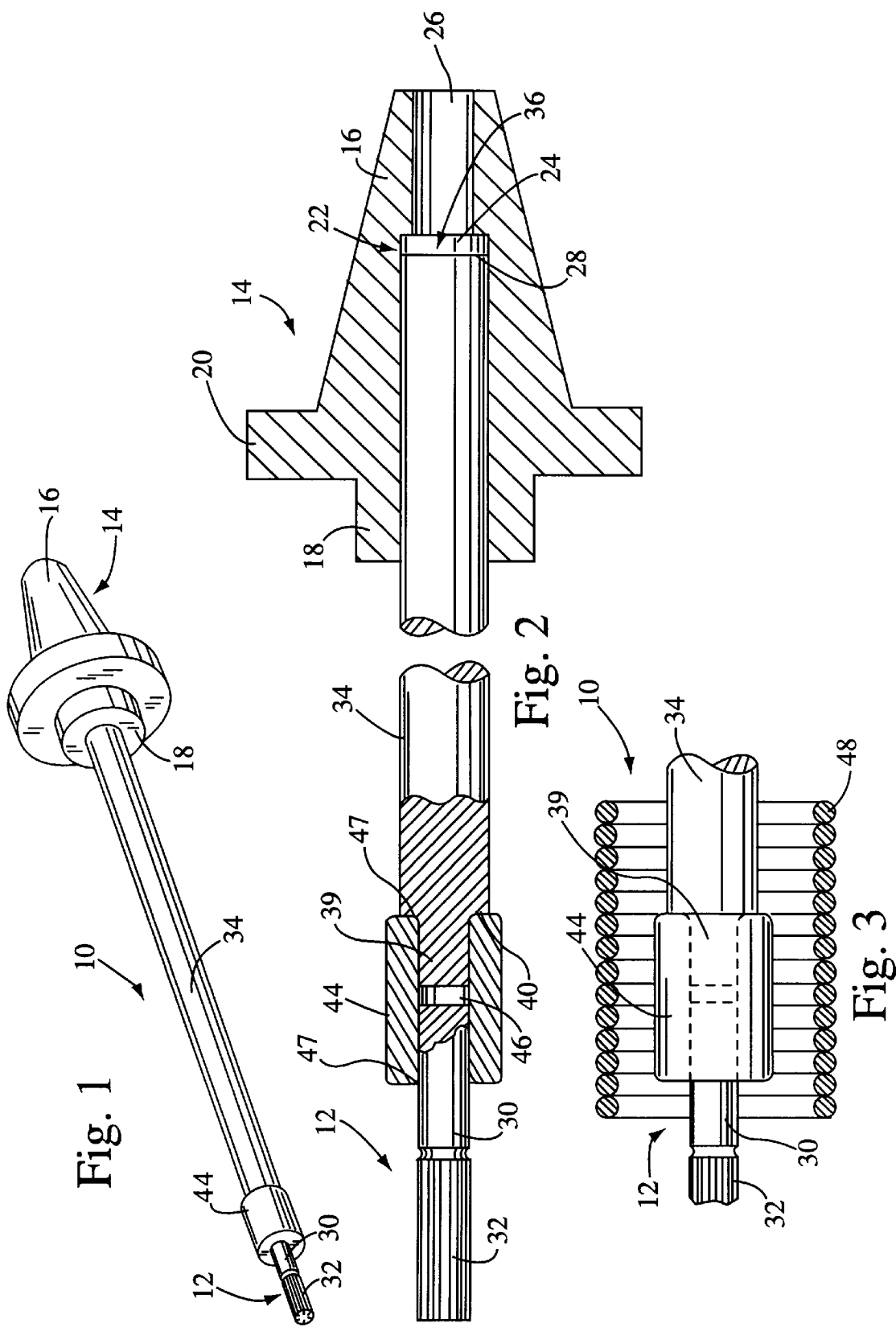

MACHINE TOOL EXTENSION AND METHOD OF FORMING THE SAME

FIELD OF THE INVENTION

The present invention relates generally to machine tools, and more particularly to a machine tool extension for interfacing a cutting tool to a tool holder through the use of heat shrink fitting techniques.

BACKGROUND OF THE INVENTION

As is well known, various tool holders have been utilized in the prior art which interface with a rotating spindle of a machine such as a milling or boring machine to securely hold a cutting tool upon the machine during the cutting of a work piece. In most prior art tool holders, a central aperture is formed therein for receiving the shank portion of the cutting tool which is to be interfaced to the milling or other machine. Subsequent to the insertion of the shank portion of the cutting tool into the central aperture, the tool holder is drawn or pulled tightly into the spindle so as to rigidly maintain the cutting tool within the tool holder.

In certain machining applications, it is necessary to use what is commonly referred to as a "long reach" cutting tool which comprises an elongate, extended shank portion having a cutting head disposed on one end thereof. The end of the shank portion opposite that including the cutting head is inserted into the central aperture and rigidly maintained within the tool holder when the tool holder is drawn into the spindle of the milling or other machine. As is well known, cutting tools, including those of the long reach variety, are typically fabricated from tungsten carbide due to its extremely high level of hardness. However, though being extremely hard, tungsten carbide is also brittle. In this respect, when a long reach cutting tool is used in high speed and other milling applications and an excessive amount of shear force is applied to the cutting head thereof, there is a tendency for the shank portion of the cutting tool to fracture in view of the brittleness of the tungsten carbide material used to fabricate the cutting tool. As will be recognized, such catastrophic failure of the cutting tool poses the threat of causing serious injury to the machine operator.

Additionally, a significant deficiency associated with the prior art tool holders themselves is that the manner in which the shank portion of the cutting tool is secured within the central aperture of the tool holder often results in the non-concentric mounting of the cutting tool within the tool holder. Such non-concentric mounting is extremely undesirable, particularly in modern, high tolerance machining applications such as those performed on a vertical milling machine wherein minor variations in the concentricity of the cutting tool within the tool holder often times results in extreme flaws in the cutting operation.

The present invention addresses the deficiencies of prior art long reach cutting tools and tool holders by providing a machine tool extension which is adapted to interface a tungsten carbide cutting tool to a tool holder and is significantly less susceptible to fracture. The extension of the present invention is also constructed to substantially eliminate the non-concentric mounting of the cutting tool relative to the tool holder by facilitating the interface of the cutting tool to the tool holder through the use of heat shrink fitting techniques.

SUMMARY OF THE INVENTION

In accordance with the present invention, there is provided a machine tool extension for interfacing a cutting tool to a tool holder. The extension is preferably used in conjunction with cutting tools having generally cylindrical shank portions and tool holders which define a central aperture or opening having a generally circular cross-sectional configuration. The extension comprises an elongate, generally cylindrical shank member having a first end and a reduced diameter second end. The first end of the shank member is insertable into and securable within the central opening of the tool holder.

In addition to the shank member, the extension of the present invention comprises a cylindrically configured bushing member which includes an aperture extending axially therethrough. The second end of the shank member is insertable into and securable within one end of the aperture, with the shank portion of the cutting tool being at least partially insertable into and securable within the other end of the aperture. The aperture of the bushing member itself also has a generally circular cross-sectional configuration.

In the preferred embodiment, the shank member is formed to have an outer diameter which slightly exceeds the diameter of the central opening of the tool holder. Additionally, the aperture of the bushing member is formed to have a diameter which is slightly less than the diameters of the second end of the shank member and the shank portion of the cutting tool. The shank member is preferably fabricated from a first material (which is typically the same material from which the shank portion of the cutting tool is formed), with the bushing member being fabricated from a second material which is less brittle than the first material. The first material preferably comprises tungsten carbide or a heavy metal (e.g., tungsten based alloys such as high density tungsten based metals), with the second material preferably comprising tool steel (e.g., H13 or A2 tool steel) or alloy steel (e.g., 4340 alloy steel). Typically, the entire cutting tool or at least the shank portion thereof will be fabricated from carbide or tungsten carbide.

Further in accordance with the present invention, the extension is used to interface the cutting tool to the tool holder by initially heating the tool holder to a temperature sufficient to thermally increase the diameter of the central opening to a size allowing the first end of the shank member to be slidably inserted to a desired axial position therein. Thereafter, the tool holder is allowed to cool to ambient temperature to cause a thermal contraction of the central opening about the shank member to rigidly secure the shank member within the tool holder.

Subsequent to the shank member being secured to the tool holder, the bushing member is heated to a temperature sufficient to thermally increase the diameter of the aperture to a size allowing the second end of the shank member and the shank portion of the cutting tool to be slidably inserted to desired axial positions in the opposed ends thereof. The bushing member is then allowed to cool to ambient temperature to cause a thermal contraction of the aperture about the second end of the shank member and the shank portion of the cutting tool to rigidly secure the second end and the cutting tool within the bushing member. It will be recognized that the previously described heat shrinking processes may be conducted in any order without departing from the spirit and scope of the present invention.

BRIEF DESCRIPTION OF THE DRAWINGS

These, as well as other features of the present invention, will become more apparent upon reference to the drawings wherein:

FIG. 1 is a perspective view of the machine tool extension constructed in accordance with the present invention, illustrating the manner in which the extension is used to interface a cutting tool to a tool holder;

FIG. 2 is a partial cross-sectional view of the extension, illustrating the manner in which the extension is secured within the tool holder and the cutting tool is secured within the extension; and FIG. 3 is a partial side elevational view of the extension, illustrating the manner in which heat is applied thereto to facilitate the heat shrink connection of the components of the extension to each other and to the cutting tool.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates a machine tool extension 10 which is adapted to interface a cutting tool 12 to a tool holder 14 through the use of heat shrink fitting techniques. As will be discussed in more detail below, the combination of the extension 10 and the cutting tool 12 is structurally similar to what is commonly referred to as a "long reach" cutting tool, except that such combination is significantly less susceptible to catastrophic failure when a shear force is applied to the cutting tool 12 during a high speed or other milling application.

The tool holder 14 with which the extension 10 is utilized is itself adapted for use in the rotating spindle of a machine such as a milling machine or a boring machine. The tool holder 14 comprises a conically tapered shank portion 16 which is adapted to be inserted into a complementary recess within the spindle. In this respect, the slope of the inner surface of the spindle recess corresponds to the slope of the outer surface of the shank portion 16, with the shank portion 16 being firmly seated within the recess when the tool holder 14 is properly secured to the spindle. Typically, the tool holder 14 is secured to the spindle by drawing the shank portion 16 into the recess of the spindle.

In addition to the shank portion 16, the tool holder 14 comprises a cylindrically configured cutting tool mounting portion 18. Formed between the shank portion 16 and the mounting portion 18 is a circularly configured flange portion 20. The flange portion 20 extends radially outward relative to the shank portion 16 and mounting portion 18. Extending axially through the tool holder 14, including the shank, mounting and flange portion 16, 18, 20 thereof, is a central opening 22. The central opening 22 includes a first section 24 which has a generally circular cross-sectional configuration and extends from the distal end of the mounting portion 18 to approximately the mid-way point of the shank portion 16. In addition to the first section 24, the central opening 22 includes a second section 26 which is coaxially aligned with and extends from the end of the first section 24 to the distal end of the shank portion 16. As seen in FIG. 2, the diameter of the second section 26 of the central opening 22 is less than that of the first section 24 such that an annular shoulder 28 is defined therebetween. The tool holder 14 is typically fabricated from tool steel or alloy steel. Those skilled in the art will recognize that the tool holder 14 bears general similarity to standard tool holder dimensional configurations such as the American Standard, Japanese B.T., European B.N., and Caterpillar V-shaped Flange Standard.

As best seen in FIG. 2, the cutting tool 12 with which the extension 10 of the present invention is preferably utilized comprises a generally cylindrical shank portion 30 which is typically fabricated from a hard, brittle material, and more particularly carbide or tungsten carbide. Formed on one end of the shank portion 30 is a cutting head 32. As shown in FIG. 2, the cutting tool 12 is a unitary structure, with the shank portion 30 and the cutting head 32 being integrally connected to each other and formed from the same carbide or tungsten carbide material. However, those of ordinary skill in the art will recognize that the shank portion 30 and cutting head 32 may alternatively comprise separate elements formed of the same or differing materials which are attached to each other via a brazing or similar attachment process.

Referring now to FIGS. 1–3, the extension 10 constructed in accordance with the present invention itself comprises an elongate, cylindrically configured shank member 34 having a first end 36 and a reduced diameter second end 38. The second end 38 is defined by a cylindrically configured distal section 39 of the shank member 34 which is separated from the remainder thereof by an annular shoulder 40. The first end 36 of the shank member 34 is insertable into and securable within the first section 24 of the central opening 22 of the tool holder 14 in a manner which will be described in more detail below. In the extension 10, at least a portion of the shank member 34 adjacent to and defining the first end 36 is formed to have an outer diameter which slightly exceeds the diameter of the first section 24 of the central opening 22 of the tool holder 14. More particularly, the diameter of the first section 24 of the central opening 22 is about 0.0003 to 0.001 inches less than the diameter of the first end 36 of the shank member 34.

The extension 10 of the present invention further comprises a cylindrically configured bushing member 44 which includes an aperture 46 having a generally circular cross-sectional configuration extending axially therethrough. As seen in FIG. 2, the opposed ends of the aperture 46 are defined by rounded edges 47 of the bushing member 44. The reduced diameter distal section 39 of the shank member 34 which defines the second end 38 is at least partially insertable into and securable within one end of the aperture 46, with the shank portion 30 of the cutting tool 12 being at least partially insertable into and securable within the other end of the aperture 46. The aperture 46 is itself formed to have a diameter which is slightly less than the diameters of the distal section 39 (and hence the second end 38) of the shank member 34 and the shank portion 30 of the cutting tool 12. More particularly, the diameter of the aperture 46 is about 0.0003 to 0.001 inches less than the diameters of the distal section 39 and shank portion 30 of the cutting tool 12.

As previously indicated, the cutting tool 12, and at least the shank portion 30 thereof, is typically fabricated from carbide or tungsten carbide. The shank member 34 of the extension 10 is itself preferably fabricated from tungsten carbide or a heavy metal (e.g., tungsten based alloys such as high density tungsten based metals). The bushing member 44 is preferably fabricated from tool steel such as H13 or A2 tool steel, alloy steel such as 4340 alloy steel, or stainless steel. In selecting the material for the bushing member 44, it is contemplated that any selected material will be less brittle than the material used to form the shank member 34 and/or the shank portion 30 of the cutting tool 12. Importantly, the tool steel or alloy steel preferably used to fabricate the bushing member 44 exhibits high thermal expansion and contraction capability. Conversely, the tungsten carbide or heavy metal preferably used to fabricate the shank member 34, as well as the carbide or tungsten carbide material typically used to fabricate the shank portion 30, exhibit low thermal expansion and contraction capabilities.

The extension 10 of the present invention is used to interface the cutting tool 12 to the tool holder 14 by initially heating the tool holder 14 to a temperature sufficient to thermally increase the diameter of the central opening 22, and in particular the first section 24 thereof, to a size allowing the first end 36 of the shank member 34 to be slidably inserted to a desired axial position therein. The insertion of the shank member 34 into the thermally enlarged first section 24 of the central opening 22 is limited by the abutment of the first end 36 against the shoulder 28 defined between the first and second sections 24, 26 of the central opening 22. Thereafter, the tool holder 14 is allowed to cool to ambient temperature for purposes of causing a thermal contraction of the first section 24 of the central opening 22 about the shank member 34 to rigidly secure the shank member 34 within the tool holder 14. In this respect, the thermal contraction of the first section 24 of the central opening 22 results in metal-to-metal contact between the portion of the shank member 34 adjacent the first end 36 and the tool holder 14.

Subsequent to the shank member 34 being rigidly secured to the tool holder 14 in the aforementioned manner, the bushing member 44 of the extension 10 is heated to a temperature sufficient to thermally increase the diameter of the aperture 46 to a size allowing at least a portion of the reduced diameter distal section 39 of the shank member 34, and at least a portion of the shank portion 30 of the cutting tool 12, to be slidably inserted to desired axial positions in the opposed ends of the aperture 46. As further seen in FIG. 2, the bushing member 44 including the thermally enlarged aperture 46 is preferably advanced over the distal section 39 of the shank member 34 until such time as one end of the bushing member 44 abuts the shoulder 40. However, those of ordinary skill in the art will recognize that a slight gap may be defined between the end of the bushing member 44 and the shoulder 40. The shank portion 30 of the cutting tool 12 is itself slidably advanced into the opposite end of the thermally enlarged aperture 46 such that approximately half of the length of the shank portion 30 resides within the aperture 46. A slight gap is preferably defined between the end of the shank portion 30 and the second end 38 of the shank member 34 within the aperture 46, though such ends may alternatively be abutted against each other. Subsequent to the distal section 39 of the shank member 34 and the shank portion 30 of the cutting tool 12 being slidably inserted into the aperture 46, the bushing member 44 is allowed to cool to ambient temperature for purposes of causing a thermal contraction of the aperture 46 about the distal section 39 and the shank portion 30 to rigidly secure the distal section 39 (and hence the shank member 34) and the cutting tool 12 within the bushing member 44.

As seen in FIG. 3, the heating of the tool holder 14 and bushing member 44 is preferably accomplished through the use of an induction heater 48. However, it will be recognized that alternative heating methods may also be employed in relation to the use of the extension 10 of the present invention. Additionally, those of ordinary skill in the art will recognize that the previously described heat shrinking steps can be conducted in any order without departing from the spirit and scope of the invention. For example, the distal section 39 of the shank member 34 and shank portion 30 of the cutting tool 12 may be secured within the bushing member 44 prior to the shank member 34 being secured within the tool holder 14. Moreover, though not shown, the shank member 34 may have alternative configurations, so long as a sufficient portion thereof adjacent the first end 36 and the reduced diameter section 39 are cylindrically configured, i.e., have generally circular cross-sectional configurations. The detachment of the components of the extension 10 from each other as well as the detachment of the extension 10 from the tool holder 14 and cutting tool 12 from the bushing member 44 is facilitated by re-applying heat to the tool holder 14 and bushing member 44. The detachment of the components of the extension 10 from each other is aided by the fabrication of the shank member 34 and shank portion 30 from materials which do not exhibit high levels of thermal expansion and contraction capability. In this respect, the application of heat to the bushing member 44 to thermally enlarge the aperture 46 thereof does not facilitate a corresponding amount of thermal enlargement of the shank portion 30 and distal section 39 of the shank member 34 which would make the removal of the distal section 39 and shank portion 30 from within the aperture 46 more difficult.

Advantageously, the use of the heat shrinking processes/ techniques to rigidly maintain the extension 10 within the tool holder 14, maintain the components of the extension 10 in attachment to each other, and maintain the cutting tool 12 within the extension 10 facilitates the interface of the cutting tool 12 to the spindle of a machine tool in a concentric fashion for high tolerance machining applications. In this respect, the use of the heat shrinking processes substantially prevents the non-concentric mounting of the shank member 34 within the tool holder 14 in view of the uniform engagement between the inner surface of the tool holder 14 defining the first section 24 of the central opening 22 and the outer surface of the shank member 34. Similarly, the non-concentric interface of the cutting tool 12 to the extension 10 is substantially prevented by the uniform engagement between the inner surface of the bushing member 44 defining the aperture 46 and the outer surfaces of the distal section 39 of the shank member 34 and the shank portion 30 of the cutting tool 12. In the present invention, the shank portion 30 is not simply inserted into a complementary bore within the second end 38 of the shank member 34 due to the susceptibility of such a configuration to the formation of stress fractures which could result in the catastrophic failure of the shank member 34.

As previously indicated, the combination of the extension 10 and cutting tool 12 is structurally similar to a "long reach" cutting tool. As explained above, long reach cutting tools include elongate, extended shank portions, and are used in specialized cutting applications. Advantageously, the use of the bushing member 44 which is formed from a material less brittle than that used to form the shank member 34 and shank portion 30 of the cutting tool 12 provides the structural equivalent of a long reach cutting tool, with substantially less susceptibility to the fracturing or other catastrophic failure of the shank member 34 due to the slight amount of give provided by the bushing member 44. In this respect, the tool steel or alloy steel preferably used to form the bushing member 44 is substantially less brittle than the carbide or tungsten carbide used to form the shank portion 30 of the cutting tool 12 and the tungsten carbide or heavy metal preferably used to form the shank member 34, and thus decreases the susceptibility of the shank member 34 to breakage or other catastrophic failure when a shear force is applied to the cutting head 32 of the cutting tool 12 during a high speed or other milling application.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A machine tool extension for interfacing a cutting tool which includes a generally cylindrical shank portion fabricated from a third metallic material having a third coefficient of thermal expansion to a tool holder which includes a central opening, said extension comprising:

an elongate, generally cylindrical shank member fabricated from a first metallic material having a first coefficient of thermal expansion, and including a first end which is insertable into and securable within the central opening of the tool holder and a reduced diameter second end; and a bushing member fabricated from a second metallic material having a second coefficient of thermal expansion which exceeds the first and third coefficients of thermal expansion, and including an aperture extending longitudinally therethrough, the second end of the shank member being insertable into and securable within one end of the aperture, with the shank portion of the cutting tool being at least partially insertable into and securable within the other end of the aperture;

said shank member being formed to have an outer diameter which slightly exceeds the diameter of the central opening of the tool holder, and said aperture being formed to have a diameter which is slightly less than the diameters of the second end of the shank member and the shank portion of the cutting tool.

2. The extension of claim 1 wherein the second metallic material used to fabricate the bushing member is less brittle than the first metallic material used to fabricate the shank member.

3. The extension of claim 2 wherein the first metallic material comprises tungsten carbide and the second metallic material comprises steel.

4. The extension of claim 3 wherein the second metallic material comprises steel selected from the group consisting of:

tool steel;

alloy steel; and stainless steel.

5. The extension of claim 1 further in combination with the tool holder and the cutting tool, wherein:

the tool holder is fabricated from a fourth metallic material having a fourth coefficient of thermal expansion which exceeds the first coefficient of thermal expansion;

the first end of the shank member is slidably insertable to a desired axial position within the central opening when a heat source is applied to the tool holder, and rigidly secured within the central opening via thermal contraction when the tool holder is allowed to cool to ambient temperature;

the second end of the shank member is slidably insertable to a desired axial position within the aperture when a heat source is applied to the bushing member, and rigidly secured within the aperture via thermal contraction when the bushing member is allowed to cool to ambient temperature; and the shank portion of the cutting tool is slidably insertable to a desired axial position within the aperture when a heat source is applied to the bushing member, and rigidly secured within the aperture via thermal contraction when the bushing member is allowed to cool to ambient temperature.

6. The extension of claim 5 wherein the second metallic material used to fabricate the bushing member is less brittle than the first metallic material used to fabricate the shank member and the third metallic material used to fabricate the shank portion of the cutting tool.

7. The extension of claim 6 wherein the first and second metallic materials each comprise tungsten carbide and the second metallic material comprises steel.

8. The extension of claim 7 wherein the second metallic material comprises steel selected from the group consisting of:

tool steel;

alloy steel; and stainless steel.

9. The extension of claim 1 wherein said bushing member has a generally cylindrical configuration with said aperture extending axially therethrough.

10. A method of interfacing a cutting tool which includes a generally cylindrical shank portion fabricated from a third metallic material having a third coefficient of thermal expansion to a tool holder which includes a central opening and is fabricated from a fourth metallic material having a fourth coefficient of thermal expansion, said method comprising the steps of:

(a) providing an elongate, generally cylindrical shank member fabricated from a first metallic material having a first coefficient of thermal expansion which is less than the fourth coefficient of thermal expansion, and including an outer diameter which slightly exceeds the diameter of the central opening, a first end, and a reduced diameter second end;

(b) heating the tool holder to a temperature sufficient to thermally increase the diameter of the central opening to a size allowing the first end of the shank member to be slidably inserted to a desired axial position therein;

(c) allowing the tool holder to cool to ambient temperature to cause a thermal contraction of the central opening about the shank member to rigidly secure the shank member within the tool holder;

(d) providing a bushing member fabricated from a second metallic material having a second coefficient of thermal expansion which exceeds the first and third coefficients of thermal expansion, and including an aperture extending longitudinally therethrough which is of a diameter slightly less than the diameters of the second end of the shank member and the shank portion of the cutting tool;

(e) heating the bushing member to a temperature sufficient to thermally increase the diameter of the aperture to a size allowing the second end of the shank member and the shank portion of the cutting tool to be slidably inserted to desired axial positions in opposed ends thereof; and (f) allowing the bushing member to cool to ambient temperature to cause a thermal contraction of the aperture about the second end of the shank member and the shank portion of the cutting tool to rigidly secure the second end and the cutting tool within the bushing member.

11. The method of claim 10 step (d) comprises selecting the second metallic material used to fabricate the bushing member to be less brittle than the first metallic material used to fabricate the shank member and the third metallic material used to fabricate the shank portion of the cutting tool.

* * * * *

UNITED STATES PATENT AND TRADEMARK OFFICE
CERTIFICATE OF CORRECTION

| | |
|---|---|
| PATENT NO. | : 6,035,512 |
| DATED | : March 14, 2000 |
| INVENTOR(S) | : Harold D. Cook |

It is certified that error appears in the above-identified patent and that said Letters Patent is hereby corrected as shown below:

Title page,
Item [63], Related U.S. Application Data, insert -- This is a continuation of Application No. 08/890,226, filed July 9, 1997, now abandoned. --

Signed and Sealed this

Sixth Day of July, 2004

JON W. DUDAS
*Acting Director of the United States Patent and Trademark Office*